United States Patent
Bhatia et al.

(10) Patent No.: US 9,323,812 B2
(45) Date of Patent: Apr. 26, 2016

(54) HYBRID BIFURCATION OF INTERSECTION NODES

(71) Applicant: ORACLE INTERNATIONAL CORPORATION, Redwood Shores, CA (US)

(72) Inventors: Rajesh Bhatia, Westport, CT (US); Prasad Tungaturthy, Stamford, CT (US); Pei Ken Hsu, Stamford, CT (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 13/861,037

(22) Filed: Apr. 11, 2013

(65) Prior Publication Data

US 2014/0310300 A1    Oct. 16, 2014

(51) Int. Cl.
*G06F 17/30* (2006.01)

(52) U.S. Cl.
CPC .... *G06F 17/30533* (2013.01); *G06F 17/30592* (2013.01)

(58) Field of Classification Search
CPC ............... G06F 17/30533; G06F 17/30592
See application file for complete search history.

(56) References Cited

U.S. PATENT DOCUMENTS

| | | | |
|---|---|---|---|
| 6,003,036 A * | 12/1999 | Martin | 1/1 |
| 6,009,265 A * | 12/1999 | Huang et al. | 1/1 |
| 6,477,535 B1 | 11/2002 | Mirzadeh | |
| 7,958,160 B2 * | 6/2011 | Ghosh et al. | 707/803 |
| 2006/0053136 A1 * | 3/2006 | Ashiri | 707/101 |
| 2006/0167865 A1 * | 7/2006 | Andrei | 707/4 |
| 2008/0183688 A1 * | 7/2008 | Chamdani et al. | 707/4 |
| 2009/0132609 A1 * | 5/2009 | Barsness et al. | 707/203 |
| 2009/0177667 A1 * | 7/2009 | Ramos et al. | 707/100 |
| 2010/0198806 A1 * | 8/2010 | Graefe et al. | 707/713 |
| 2011/0060731 A1 * | 3/2011 | Al-Omari et al. | 707/718 |
| 2011/0125730 A1 * | 5/2011 | Bordawekar et al. | 707/718 |
| 2012/0284084 A1 * | 11/2012 | Popkov et al. | 705/7.31 |
| 2013/0205028 A1 | 8/2013 | Crockett | |
| 2013/0262437 A1 * | 10/2013 | Abhinkar | 707/718 |

* cited by examiner

*Primary Examiner* — Daniel Kinsaul

(74) *Attorney, Agent, or Firm* — Kilpatrick Townsend & Stockton LLP

(57) ABSTRACT

A method of processing a set of intersection queries in a multi-dimensional data structure may include receiving the set of intersection queries for the multi-dimensional data structure. The method may also include determining whether to process each of the set the intersection queries individually, or whether to process the set of intersection queries together using pre-cached modifier mappings. The method may additionally include processing the set of intersection queries, and providing intersection values that correspond to the set of intersection queries.

18 Claims, 11 Drawing Sheets

HYBRID BIFURCATION OF INTERSECTION NODES

BACKGROUND

Modern Enterprise software may include accounting applications to help monitor an organization's finances. The accounting applications may manage transactions and finances for the entire organization, or departments or subsidiaries within the organization. Accounting applications may also be used to manage complex accounting, inventory management, balance sheet and financial report generation, and any other financial details of the business. For large businesses, Enterprise Resource Planning software may be used, and may include functional modules such as accounts payable, accounts receivable, payroll, and trial balance.

Modern enterprise software may include accounting applications to help monitor an organization's finances. The accounting applications may manage transactions and finances for the entire organization, or departments or subsidiaries within the organization. Accounting applications may also be used to manage complex accounting, inventory management, balance sheet and financial report generation, and any other financial details of the business. For large businesses, Enterprise Resource Planning (ERP) software may be used, and may include functional modules such as accounts payable, accounts receivable, payroll, and trial balance.

In order to manage the large amount of data that may be associated with the financial applications of Enterprise software, multidimensional data structures may be used. Multidimensional data structures may provide many facets by which information may be stored, organized, sorted, and analyzed. The vector space involved with a multidimensional data structure may be sparse yet exceedingly complex. In order to retrieve data within the multidimensional data structure, queries may be received and processed. The processing time associated with the queries may vary depending upon the complexity of the request or the multidimensional data structure.

BRIEF SUMMARY

In one embodiment, a method of processing a set of intersection queries in a multi-dimensional data structure may include receiving the set of intersection queries for the multi-dimensional data structure. The method may also include determining whether to process each of the set the intersection queries individually, or whether to process the set of intersection queries together using pre-cached modifier mappings. The method may additionally include processing the set of intersection queries, and providing intersection values that correspond to the set of intersection queries.

In another embodiment, a computer-readable memory may be presented. The computer-readable memory may comprise a sequence of instructions which, when executed by one or more processors, causes the one or more processors to process a set of intersection queries in a multi-dimensional data structure. The instructions may cause the processor(s) to receive the set of intersection queries for the multi-dimensional data structure. The instructions may also cause the processor(s) to determine whether to process each of the set the intersection queries individually, or whether to process the set of intersection queries together using pre-cached modifier mappings. The instructions may additionally cause the processor(s) to process the set of intersection queries, and provide intersection values that correspond to the set of intersection queries.

In yet another embodiment, a system may be presented. The system may include one or more processors and a memory communicatively coupled with and readable by the one or more processors. The memory may comprise a sequence of instructions which, when executed by the one or more processors, cause the one or more processors to process a set of intersection queries in a multi-dimensional data structure. The instructions may cause the processor(s) to receive the set of intersection queries for the multi-dimensional data structure. The instructions may also cause the processor(s) to determine whether to process each of the set the intersection queries individually, or whether to process the set of intersection queries together using pre-cached modifier mappings. The instructions may additionally cause the processor(s) to process the set of intersection queries, and provide intersection values that correspond to the set of intersection queries.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
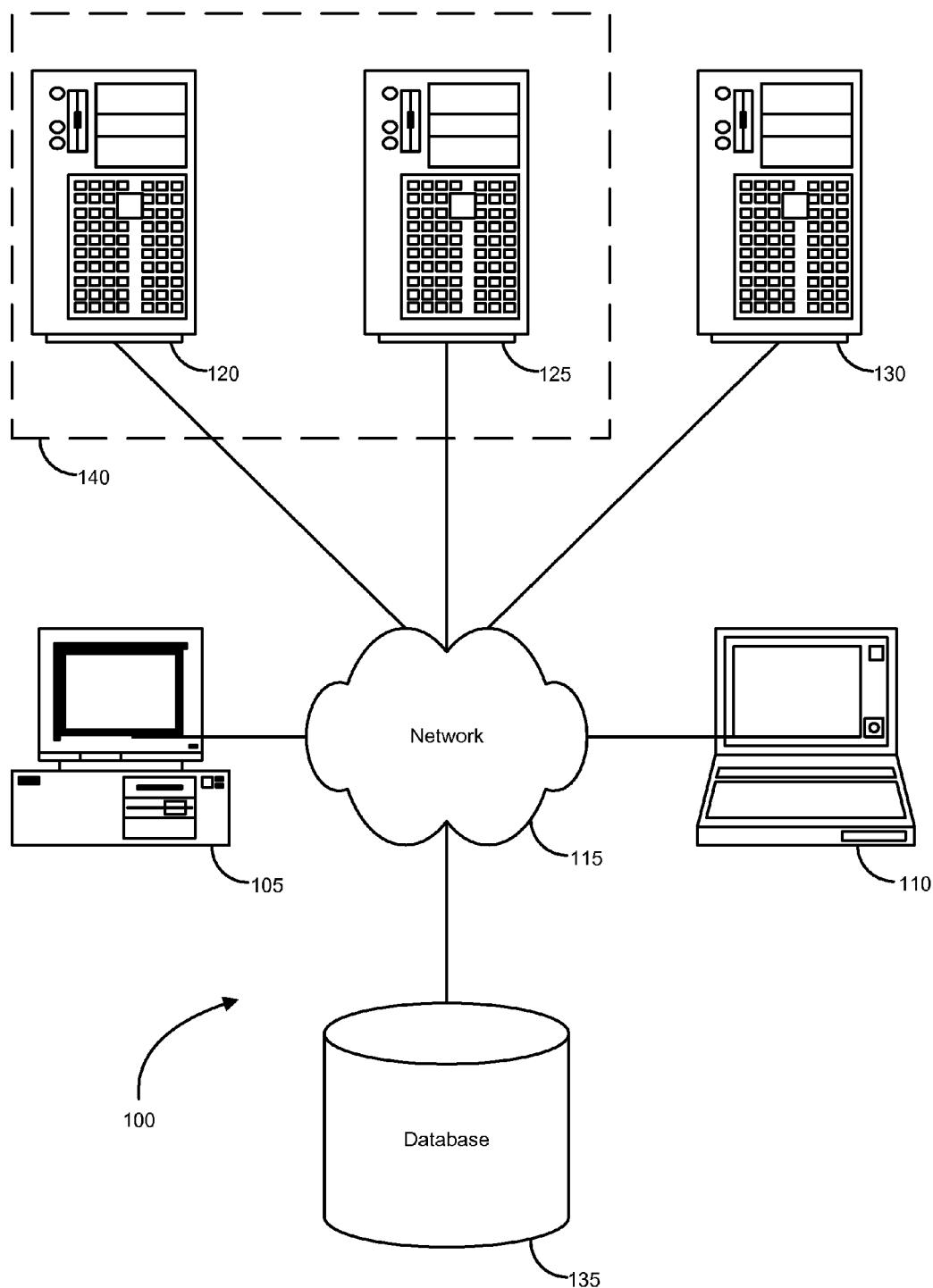
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
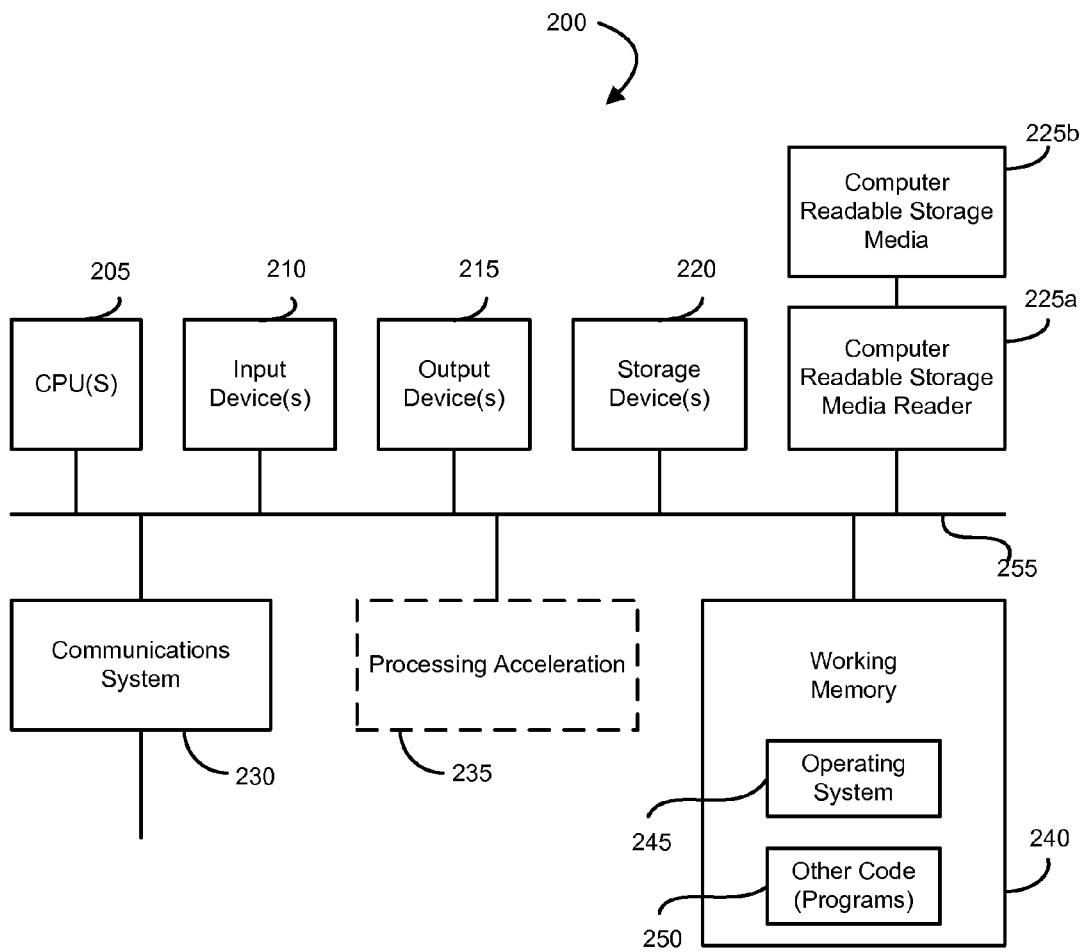
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Described herein, are embodiments for bifurcating the process for servicing intersection queries in a multidimensional data structure between two different algorithms. Determining which algorithm to use may be based on the size and complexity of the multidimensional data structure, the size of the query, the composition of the query, and/or the like. The first approach may be more computationally intensive and increase latency while minimizing preprocessing requirements and memory usage. The first approach can process each intersection node individually before moving on to a subsequent intersection node. In contrast, the second approach can process nodes in parallel using pre-cached mappings to minimize computation time and latency. The second approach may use more memory but achieve faster processing times in some cases.

The methods and systems described herein may be generally applicable to many different types of data storage systems. In some particular embodiments, the methods and systems described herein may be specially adapted to operate in a financial reporting system. Merely by way of example, one such financial reporting system may be the Oracle® Financial Management Analysis (OFMA) suite commercially available from Oracle® Corporation. Other types of financial systems and/or data reporting tools may also be used to implement these embodiments.

In some embodiments, these methods and systems may deal with a multidimensional data structure. A multidimensional data structure may also be referred to as a multidimensional cube, or a hypercube. Generally, a multidimensional data structure is comprised of facts called measures that are categorized by dimensions. The measures are placed at the intersections of the data structure, which is spanned by the dimensions as a vector space. In some embodiments, the multidimensional data structure may be created from a star schema or a snowflake schema of tables in a relational database. Measures can be derived from the records in a fact table and dimensions can be derived from the dimension tables of the relational database. Therefore, a multidimensional data structure can be defined as a variation of the relational data model that uses multidimensional structures to organize data and express relationships between the data. An intersection in a multidimensional data structure may be described as the point in the vector space where each dimension has a specific data value.

As used herein, the term "multidimensional data structure" may be used generally to describe any data structure having multiple dimensions. In some specific embodiments, the multidimensional data structure may refer specifically to a data cube or hypercube. The multidimensional data structure may provide for multiple levels of detail within each dimension by arranging the members of each dimension into one or more hierarchies. A "time" dimension, for example, may be represented as a hierarchy starting with the total time, and breaking child layers down into years, quarters, months, and/or days. Similarly, an "accounts" dimension may begin at the top level with net income, which is broken further down into sales, expenses, expense accounts, and/or the like.

In a multidimensional data structure, an "intersection" may be defined as a point in the data structure where each dimension is assigned a value. For example, for an intersection involving a "total sales" value, each associated dimension may also be assigned a value. A date range may be specified, a particular location may be specified, a product may be specified, the currency type may be specified, and/or the like. Thus, the "total sales" value may comprise an intersection of sales revenues during the month of March at all Colorado locations for software product "X". In a N-dimensional data structure, an intersection may be a single point in the N-dimensional space where each dimension has a specified value.

Figure 3B:
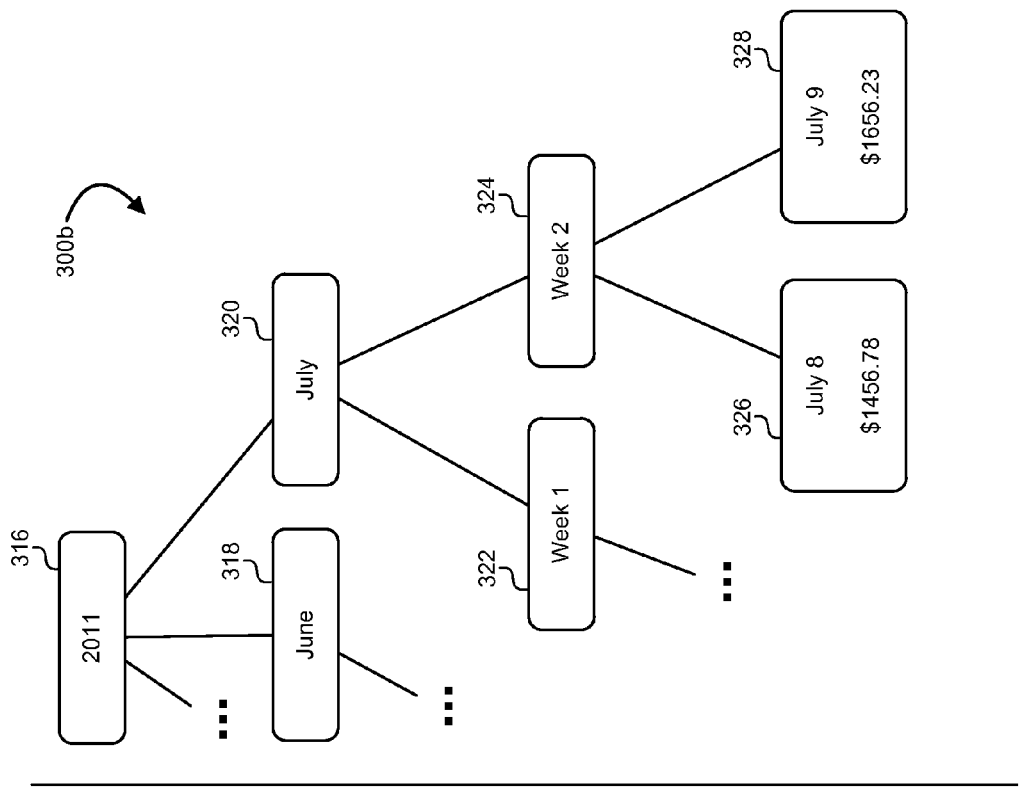
FIG. 3B illustrates a portion of a multidimensional data structure along second a dimension, according to some embodiments.
Figure 3A:
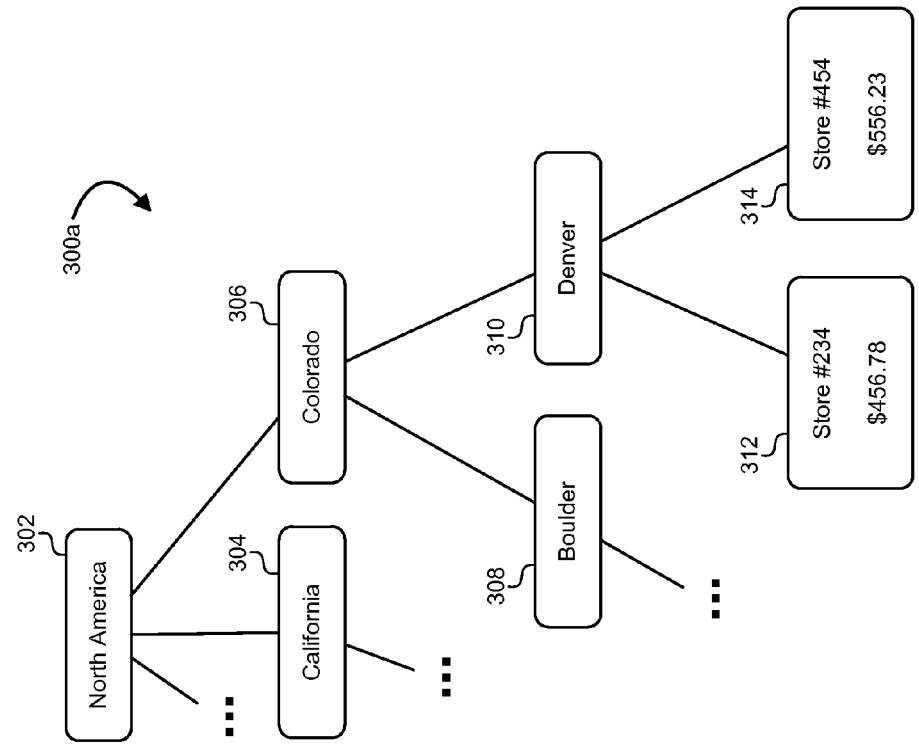
FIG. 3A illustrates a portion of a multidimensional data structure along a first dimension, according to some embodiments.

FIG. 3A illustrates a portion of a multidimensional data structure 300a along a first dimension, according to some embodiments. In this particular embodiment, the first dimension represents physical locations of retail stores. In this embodiment, it can also be assumed that the other dimensions (not shown) relevant to the location dimension may have a value specified.

Generally, information may be entered at the base level of the multidimensional data structure 300a. For example, when entering a sales transaction at store #234, this information is not usually entered at the city or state level, but rather at the individual store level. A "base level" may be considered the lowest level of each branch of the multidimensional data structure 300a, and may be defined as the level at each branch in which data is entered. In this example, transactional information would be entered at base level node 312 representing store #234 and base level node 314 representing store #454.

In contrast to entering data, data may be queried at any level of the multidimensional data structure 300a. Is often useful to see an aggregated total of descendent node values for a particular parent node. For example, node 310 representing all the stores in the Denver area may be queried to return a total sales value for each of the stores in the Denver area, including store #234 and/or store #454. Similar operations may take place for node at the same level, such as node 308 representing stores in the Boulder area.

Parent nodes may have many levels within the multidimensional data structure 300a. For example, continuing with the location dimension, node 308 and node 310 may be children of node 306 representing stores in the state of Colorado. Again, each level may include similar parent nodes, such as a node representing the state of California 304. Some multidimensional data structures may also include a root node 302 acting as a super parent to each child node in the multidimensional data structure 300a.

For example, some embodiments may allow a user or process to query total sales data for node 306 representing Colorado. In order to form a proper intersection, other dimensions may also need to be specified such as a date range, a product type, a store type, a currency type, and/or the like. The query could then aggregate an appropriate amount from base node 312 and base node 314 representing individual stores, as well as any base nodes related to node 308 representing Boulder stores, and then aggregate this sales total for node 306 representing Colorado.

FIG. 3B illustrates a portion of a multidimensional data structure 300b along second a dimension, according to some embodiments. In this particular embodiment, the second dimension represents time intervals. Root node 316 may represent a top-level division of data by year. Child nodes 318, 320 may divide each year into one of 12 months. Similarly, node 322 and node 324 may divide each month into weeklong periods. Finally, each week node may be subdivided into individual days, such as node 326 and node 328. Different or further subdivisions may also be possible, but are not shown here for brevity.

As described above for FIG. 3A, data may be entered at the base level into node 326 and 328. A transaction may include a store number, a product, an amount charged, and/or the like. For the time dimension, a transaction dollar amount may be entered and added to the total for a single day. When an administrator queries a parent node, such as the week represented by node 324, the totals for each child node 326, 328 may be rolled up the hierarchy. It may also be assumed that other dimensions of been defined such that a single data point may be returned.

The examples used in relation to FIG. 3A and FIG. 3B use only a single dimension in a simplified data structure with only a few levels. In reality, multidimensional data structures may include many dimensions and many levels. Therefore, a query may involve thousands of base nodes and many tree levels in each dimension. The simplified data structures above are used merely as examples, and thus the embodiments described herein are generally applicable to very complex and large multidimensional data structures.

The process of receiving a query for a particular node, determining which base nodes contribute to the value of the queried node, and calculating a total can be a costly process in terms of memory and/or processing power. Generally, users expect queries to return accurate data in real time. This may be a particularly important when data is rapidly changing due to real-time data entry. For example, total sales data may be constantly updated in real time as transactions are processed at each point of sale. Therefore, aggregated totals of total sales values may be constantly in flux. A query may be considered a snapshot in time of a continuously changing value. Therefore delays in processing may render what would otherwise be live data to be stale and out of date. Some embodiments may optimize the data query process for nodes. These embodiments are described in greater detail below.

Figure 4:
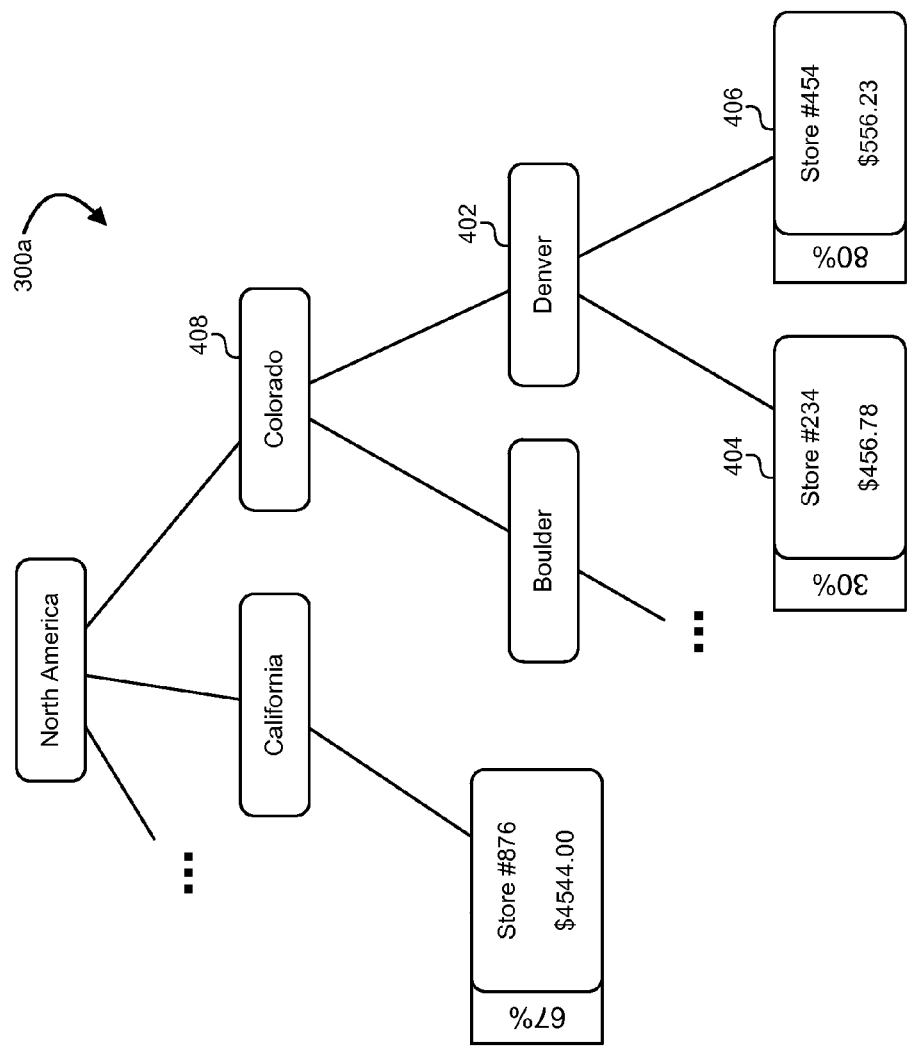
FIG. 4 illustrates a portion of a multidimensional data using contribution weights, according to some embodiments.

Adding to the complexity of aggregating totals up the hierarchy of a multidimensional data structure, different contribution weights may be applied at each level. FIG. 4 illustrates a portion of a multidimensional data using contribution weights, according to some embodiments. As used herein, the term "contribution weight" may be used to describe a percentage of a value represented by a child node that contributes to a value represented by the parent node. For example, a child node representing sales may store data related to the sales of a particular subsidiary company. In a financial setting, an organization may only own a certain percentage of the subsidiary company. Subsidiary companies may be organized beneath the organization in the multidimensional data structure. When preparing a data report, the aggregated total in the parent organization node may only use a percentage of the sales from the child node representing the subsidiary company. For example, only 30% of the sales of the subsidiary company may contribute to the total sales of the parent organization.

A contribution weight may also be referred to herein as a type of modifier. A modifier may be broadly construed as any value that is used to adjust a value in a child node before it is rolled up into a parent node. In addition to contribution weights, modifiers may also include a net income percentage of gross revenues, an after-tax portion of revenues, taxable income percentages, and/or the like. Modifiers may be thought of as a way to alter values that does not require specifying additional dimensions. For brevity, contribution weights may be referred to interchangeably with modifiers herein. However, it will be understood that a contribution weight is merely a type of modifier, which may include many other value types.

In some embodiments, modifiers may be applied only to the immediate parent. Therefore, each level might have its own contribution weight. For example, store #234 represented by node 404 may be associated with a modifier of 30% for a contribution weight. Thus, node 404 may contribute 30% of its income to node 402 representing Denver. Similarly, store #454 represented by node 406 may contribute 80% of its income to node 402 representing Denver. Although not shown explicitly, node 402 representing Denver may have its own modifier that is applied to the aggregated totals before they are rolled up to, for example, node 408 representing Colorado.

In other embodiments, modifiers may persist throughout a rollup operation in the hierarchy. Thus, a contribution weight may be applied once as it is applied to its associated node, and the resulting total can be rolled up the hierarchy without additional computations involving the modifier. Therefore, 30% of the total from node 404 and 80% of the total from node 406 could be rolled up to Denver in node 402, and that total could be rolled up to Colorado at node 408 without additional modifier calculations.

In some embodiments, modifiers may not be a static value that is stored in a node. Instead, a contribution weight may be calculated according to current financial data in real time in order to reflect live data. For example, a contribution weight may be calculated by looking up a percentage of current ownership in a subsidiary. Alternatively, a contribution weight may be calculated by examining a current value compared to a government provided tax bracket.

Figure 5:
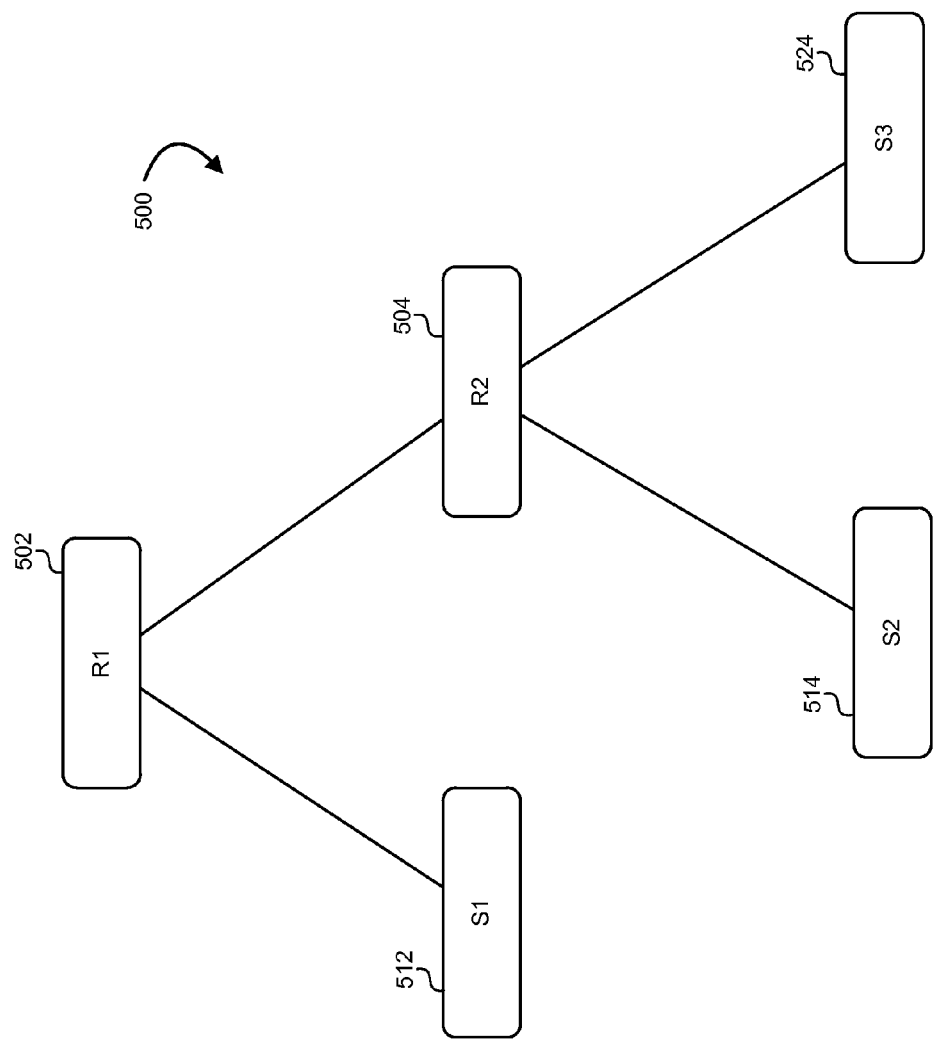
FIG. 5 illustrates a simplified generic multidimensional data structure along a single dimension, according to some embodiments.

FIG. 5 illustrates a simplified generic multidimensional data structure 500 along a single dimension, according to some embodiments. Embodiments described herein describe two different methods for processing requests for intersections. Multidimensional data structure 500 will be used as an example to illustrate how these two different approaches may be implemented. Nodes 502, 504 that have an "R" label may be regarded as parent nodes, while nodes 512, 514, 524 that have an "S" label may be regarded as base nodes.

Considering the first approach, a batch of intersections may be requested. The batch of intersections may include many intersections to be retrieved from a single multidimensional data structure 500. For simplicity, this example considers a batch of intersections that includes values from node 502 and node 504. The first approach finds base level projections on all dimensions for each intersection. For each base level node that contains actual data, calculations may be required to find the modified value that contributes to the requested intersection. For example, an intersection requesting a value from node 504 may require a projection of the value stored in node 514 combined with a calculated contribution weight. By aggregating all of the weighted contributions as applied to each base node, the requested value for a particular intersection can then be returned to the requesting user/system.

Using this first approach, each requested intersection may be processed separately. Continuing with the example where intersections on node 502 and node 504 are requested, the following operations may be performed. Base nodes 512, 514, and 524 contributing to the total in note 502 may be enumerated, or projected onto node 502. In other words, the system may determine which of all the base nodes will be needed to calculate an aggregated total for node 502. Next, the system can compute modifiers that apply for each of the enumerated base nodes as they we be projected onto the requested intersection node, node 502. As described above, computing contribution weights may be simple or complicated, depending on the particular embodiment. Finally, the modified data from nodes 512, 514, and 524 may be added to node 502.

Because a set of intersections is often received as a batch, this example also includes an intersection on node 504. Using the first approach, the same process may be carried out for node 504 as was carried out for node 502. First, base nodes 514 and 524 contributing to the total in the node 504 may be enumerated, or projected onto node 504. Next, contribution weights may be computed for the projection of node 514 onto node 504 as well as the projection of node 524 onto node 504. Finally modified data from nodes 514 and 524 that include the contribution weight calculations may be added to node 504. Individual results for each requested intersection in the batch of intersections may be provided in real time as they are retrieved and processed, or alternatively may be returned in a batch once they are all completed.

Figure 6:
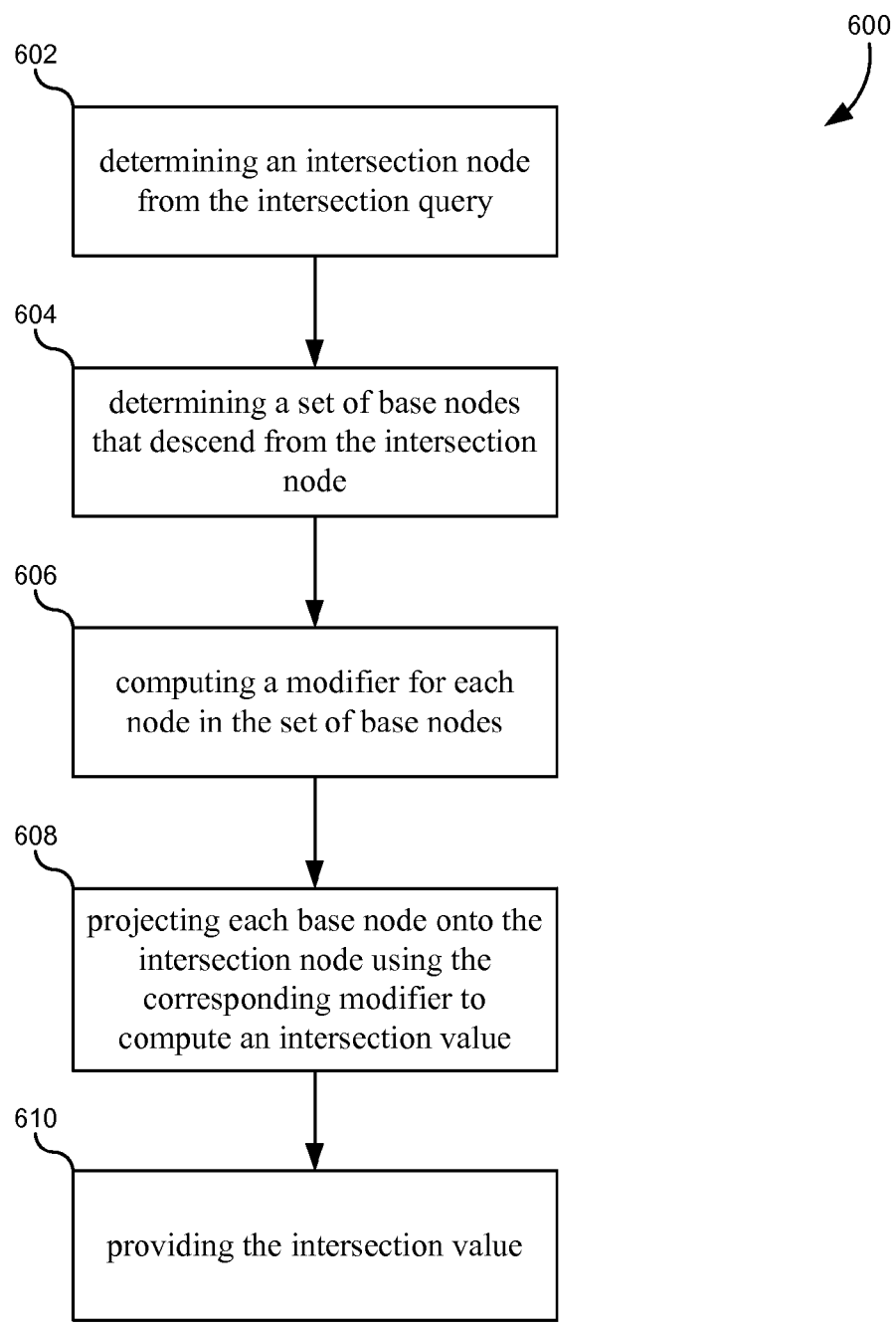
FIG. 6 illustrates a flowchart of a method for processing a set of intersection queries individually, according to one embodiment.

FIG. 6 illustrates a flowchart 600 of a method for processing a set of intersection queries individually, according to one embodiment. Flowchart 600 may be used to implement the first approach described above in relation to FIG. 5. This method may be performed for each intersection query in the set of intersection queries individually. For each intersection query, the method may include determining an intersection node from the intersection query (602). For example, a query may describe "total revenue from product X during January from Colorado stores." The system can translate this type of description into a particular set of dimensions that identify a node within a multidimensional data structure. In various embodiments, the queries may be in the form of an SQL request, a plain text request, a set of identifying dimensions, and/or the like.

The method may also include determining a set of base nodes that descend from the intersection node (604). The multidimensional data structure may be queried to return a set of base nodes that descend from the intersection node. This determination may result in an enumerated list of base nodes that can be processed individually and for which modifiers may be computed individually.

The method may additionally include computing a modifier for each node in the set of base nodes (606). The set of base nodes made include different modifiers that involve different calculations based on different dimensions, factors, and/or the like. The method may further include projecting each base node onto the intersection node using the corresponding modifier to compute an intersection value (608). The value stored within each base node may be extracted and modified according to the modifier. In some embodiments the modifier may comprise a contribution weight in the form of a percentage value. Each modified value from each base node may then be projected onto the intersection node identified earlier in the method. In some embodiments, projecting modified values from base nodes onto the intersection nodes may comprise aggregating these values together with an existing value stored in the intersection node. Other embodiments may aggregate the modified base node values together and replace a value stored in the intersection node.

The method may also include providing the intersection value (610). The method may then be repeated for each intersection query in the set of intersection queries. As described above, providing intersection values may be done together in a batch, or they may be provided incrementally as they are processed by this method.

In some cases, the method described above for processing intersection queries individually according to the first approach may be most efficient. This method requires very little memory in addition to the multidimensional data structure itself, and may be advantageous based on the characteristics of both the batch of intersection queries and the sparseness, depth, and complexity of the multidimensional data structure. However, in other cases a second approach may be more advantageous. This second approach pre-caches some computations that may be duplicated in the first approach described above. While pre-caching may increase the memory usage, computation workload may be reduced.

Turning back to FIG. 5, the same example where intersections on node 502 and node 504 have been requested can be repeated to contrast the second approach with the first approach. Recall that in the first approach each intersection node was processed individually. This led to duplicated computations for node 514 and node 524. Using the second approach, information may be cached with the intersection nodes. In some embodiments, a pre-cached modifier mapping may be used to quickly aggregate each base node data point into any associated intersection requests.

Using the second approach, the set of intersection queries that includes node 502 and node 504 may be processed together using pre-cached modifier mappings. For example, the contribution weight for each base level node may be computed and cached in association with one or more ancestor nodes. In some embodiments, this pre-caching operation may be done prior to the request being made, and thus the pre-caching operations need not factor into response time or computing power required to service the batch of intersection queries.

With the modifier mappings pre-cached, the second approach can enumerate all base level nodes that are associated with intersection nodes. In this case, the enumeration would include nodes 512, 514, and 524 for node 502, as well as nodes 514 and 524 for node 504. The enumeration operation could detect duplicate base nodes and remove them from the enumeration. The final enumeration could include a single instance of nodes 512, 514, and 524.

After generating the enumeration of base level nodes, the second approach can incrementally process each base level node in the enumeration individually. In the current example, the second approach could combine the value of node 512 with its pre-cached modifier from the pre-cached modifier mappings, and add the combined value into node 502. Similarly, the second approach could combine the value of node 514 with its pre-cached modifier from the pre-cached modifier mappings, and add the combined value into node 502 as well as node 504. The value of node 524 combined with its pre-cached modifier may also be added to both node 502 and node 504.

In contrast to the first approach, the second approach processes base nodes from the bottom up, while the first approach processes intersection nodes from the top down. The second approach offers the advantage that modifier mappings can be pre-cached, and thus these computations need not take place at runtime when a delay would be noticeable. The second approach also eliminates redundant computations and analyses related to single base nodes that contribute to multiple intersection nodes.

Figure 7:
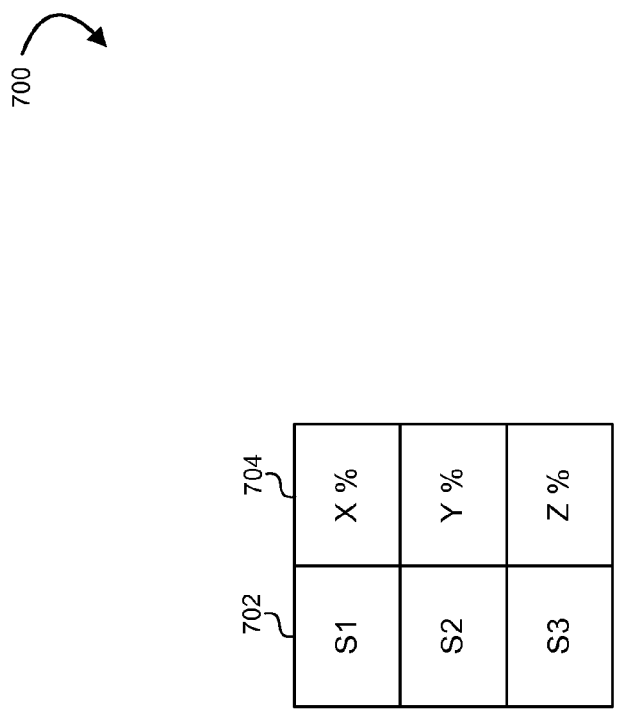
FIG. 7 illustrates a diagram of a pre-cached modifier mapping, according to one embodiment.

FIG. 7 illustrates a diagram 700 of a pre-cached modifier mapping, according to one embodiment. This embodiment implements the mapping as a table having a list of node identifiers 702 and a corresponding list of modifiers 704. When the modifiers 704 comprise a contribution weight, the list of modifiers 704 may include percentages, ratios, or other scaling factors that may be used to determine the total contribution of the associated base node.

In this particular embodiment, the pre-cached modifier mapping is depicted as a table. In other embodiments, the pre-cached modifier mapping may be stored as a part of each base node or each ancestor node in the multidimensional data structure. In some embodiments, a node template may include data elements for storing pre-calculated modifiers. For example, a class in an object oriented programming language may include memory locations for storing the modifiers. Modifiers may be stored in base level nodes, or alternatively in ancestor nodes that would require data from the base nodes if they are identified by an intersection query.

Figure 8:
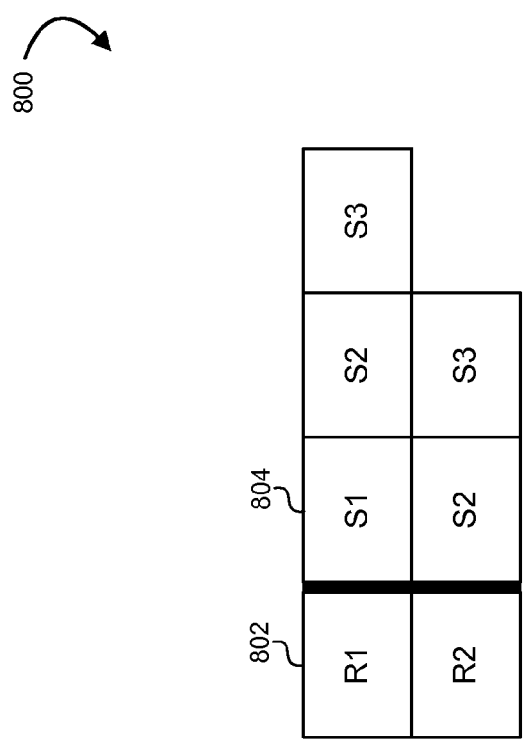
FIG. 8 illustrates a diagram of an additional type of mapping that may be used for the second approach, according to one embodiment.

FIG. 8 illustrates a diagram 800 of an additional type of mapping that may be used for the second approach, according to one embodiment. In addition to mapping pre-cached modifiers to particular base/intersection nodes, intersection nodes may keep an enumerated list of base nodes that may be required for an intersection query implicating the particular intersection node. Normally, a tree data structure may need to be traversed from a given intersection node to identify all of the base nodes that include values to be rolled up the hierarchy. Instead of requiring repeated treats reversals, the second approach may store the enumerated list of relevant base nodes in each intersection node.

In one embodiment, a table may be stored that includes a list of intersection nodes 802 as well as corresponding list of relevant base nodes 804. This table may be stored along with the multidimensional data structure, and may be referenced to resolve a batch of intersection queries. Alternatively, other embodiments may include pointer fields within each intersection node that reference the base nodes. When resolving an intersection query, the intersection node may simply follow the list of pointers in the pre-cached mapping associated with the intersection node.

Figure 9:
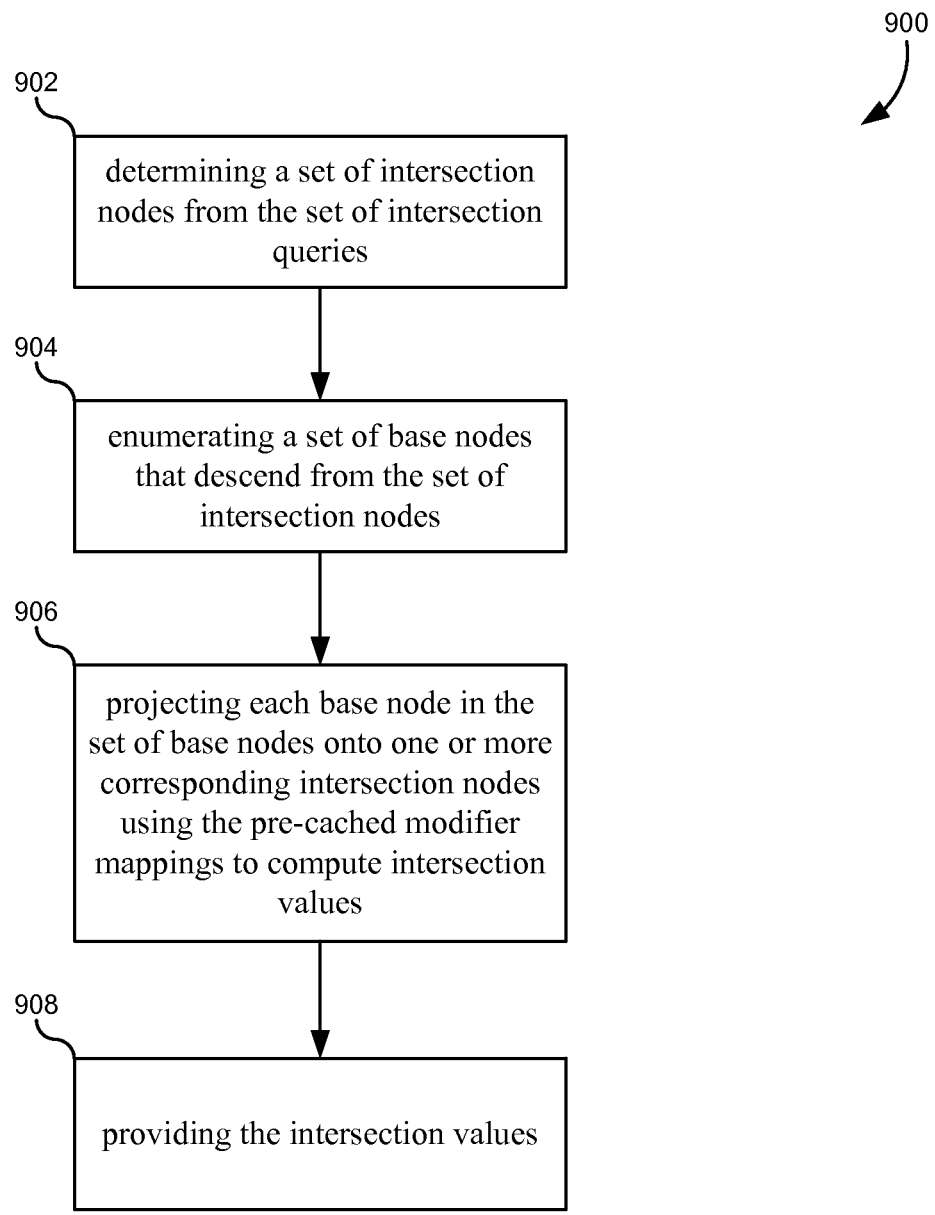
FIG. 9 illustrates a flowchart of a method of processing a set of intersection queries together using pre-cached modifier mappings.

FIG. 9 illustrates a flowchart 900 of a method of processing a set of intersection queries together using pre-cached modifier mappings. The method of flowchart 900 may implement the second approach as described above. The method may include determining a set of intersection nodes from the set of intersection queries (902). Like the first approach, intersection nodes may be extracted from queries having many different formats. For example, some queries may be extracted from plain text statements, SQL requests, memory addresses, and/or the like.

The method may also include enumerating a set of base nodes that descend from the set of intersection nodes (904). Some embodiments may include a a pre-cached enumerated list of base nodes for each intersection node. In this case, each intersection node may simply provide its internal list of related base nodes. In other embodiments, the tree may be traversed to determine the base nodes for each intersection node implicated by the queries. In some embodiments, the lists of base nodes for each intersection node may be combined to form a master list of base nodes for the batch. Duplicates may be removed such that each base node is only processed a single time.

The method may additionally include projecting each base node in the set of base nodes onto one or more corresponding intersection nodes using the pre-cached modifier mappings to compute intersection values (906). In contrast to the first approach, the second approach may use the pre-cached modifiers and combine each base node value with its associated modifier. Combinations may include any type of mathematical or logical operator, such as multiplications, unions, intersections, percentages, and/or the like. In some embodiments, the modifiers may comprise a contribution weight that describes a percentage of the base node value that should be attributed to its ancestor nodes.

Instead of processing each intersection node, some embodiments may process each base node. In some cases, a single base node may be projected onto multiple intersection nodes. A single modifier may be combined with the base node value, and the combined value may be projected onto each associated intersection node. In some embodiments, intersection nodes may have different modifiers for the same base node. In this case, the base node could be combined with multiple different modifiers to generate different values to be projected onto each intersection node.

The method may further include providing the intersection values (908). In some embodiments, a intersection value may be provided as soon as each of its base nodes have been processed. Thus, intersection values may be returned incrementally as the process works through each base node. In other embodiments, all of the intersection values may be returned in a batch.

Having discussed two different approaches for processing a batch of intersection queries, it should be noted that there is a trade-off between memory and performance involved with each approach. The first approach requires less memory and fewer preprocessing or background caching operations, while requiring longer latency and more runtime calculations as the batches are processed. In contrast, the second approach requires more memory and more preprocessing or background caching operations, while providing shorter latency and fewer runtime calculations as the batches are processed. Some embodiments may determine which of the two approaches will be most efficient and use that approach to process the batch of intersection queries.

Figure 10:
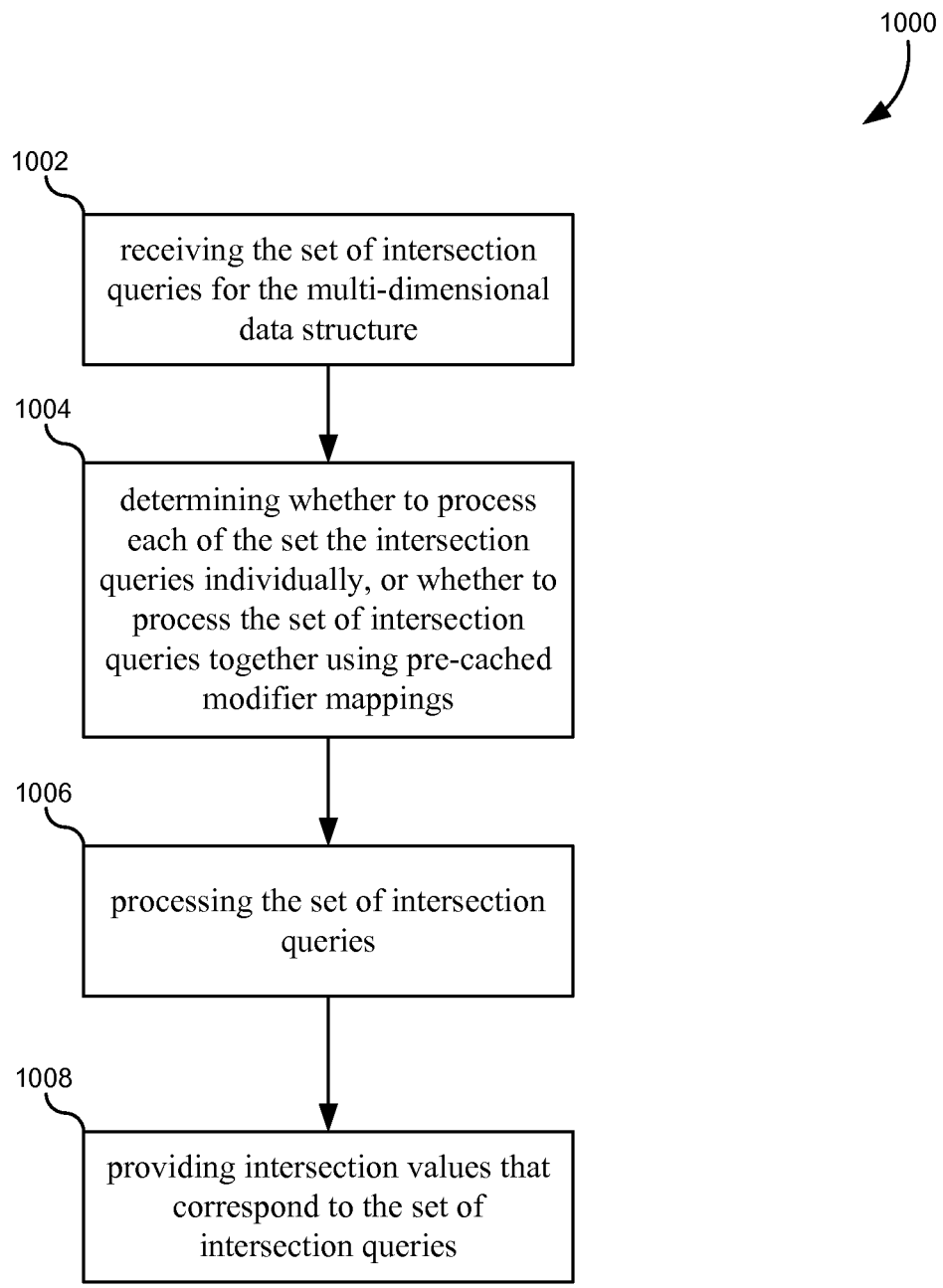
FIG. 10 illustrates a flowchart of a method of processing a set of intersection queries in a multi-dimensional data structure, according to one embodiment.

FIG. 10 illustrates a flowchart 1000 of a method of processing a set of intersection queries in a multi-dimensional data structure, according to one embodiment. The method may include receiving the set of intersection queries for the multi-dimensional data structure (1002). The multi-dimensional data structure may comprise a large database, or data cube, storing transactional information for a business. The multi-dimensional data structure may be part of an Enterprise Software System (ESS).

The method may also include determining whether to process each of the set of intersection queries individually or whether to process the set of intersection queries together using pre-cached modifier mappings (1004). This determination may be made based on a number of different factors. The second approach performs very well when a large number of intersections are requested at the same time, due to the reduction in repeat performance of the same processing steps for repeated base nodes. The second approach also performs well when data points within the multi-dimensional data structure are reasonably dense. However, as described above, this is not always the case. Therefore, the process described in flowchart 1000 may be thought of as an automatic bifurcation algorithm that chooses between the first approach and the second approach for any given request.

This bifurcation algorithm may take into consideration a number of different factors. In some embodiments, the bifurcation algorithm may consider the number of requested intersections in each dimension. For example, the bifurcation algorithm may analyze the number of intersections requested and based at least in part on the batch size. For larger batches, the second approach may be more efficient. For smaller batches of intersections, the first approach may be more efficient. Some embodiments may also determine the number of repeated base nodes in the processing steps. For example, fewer intersections with a large number of common base nodes may use the second approach, while many intersections with very few common base nodes may use the first approach.

In some embodiments, the bifurcation algorithm may also consider the percentage of base level intersections that are populated with non-zero data. This may relate to the base level intersections that implicate a particular batch, or alternatively may relate to all base level implications in the multi-dimensional data structure. In some cases, this may be referred to as the sparsity of the multi-dimensional data structure. Generally, multi-dimensional data structures are sparse most of the time. (Predominantly dense multi-dimensional data structures would result in potentially trillions of intersections.)

If the sparsity of the multi-dimensional data structure exceeds a threshold value, then the second approach of processing the set of intersection queries together using pre-cached modifier mappings may perform better. Alternatively, if the sparsity of the multi-dimensional data structure does not exceed a threshold value, then the first approach of processing the set of intersection queries individually may perform better. Depending on the particular embodiment, the threshold value may be 0.25%, 0.5%, 0.75%, 0.90%, 1.0%, 1.1%, 1.25%, 1.5%, 2%, 2.5%, 3%, 5%, 10%, 15%, 25%, and/or the like. In one implementation, experimental data was used and a sparsity threshold of approximately 1.0% resulted in the best performance.

In some embodiments, the bifurcation algorithm may also consider the depth of the tree for the requested intersections. Note that each intersection request may have a different depth, i.e., a different number of generations between the intersection node and the most distant base node. Some intersection nodes may have only a single level between the intersection node and any base nodes. Other intersection nodes may have tens or hundreds of levels between the intersection node and the most distant base node. In one embodiment, the average depth of the requested intersections may be computed and compared to a threshold value. The threshold value may depend on the particular embodiment, and may include values such as 1 level, 2 levels, 3 levels, 5 levels, 6 levels, 8 levels, 10 levels, and/or the like. Ranges of these values or similar values may also be used. In one implementation, experimental data was used and an average depth threshold of 5 levels resulted in the best performance. In another implementation, an average depth threshold of 7 levels resulted in the best performance. If the depth exceeds a threshold value, then the second approach may be more efficient, otherwise the first approach may be more efficient.

In some embodiments, the bifurcation algorithm may also consider the base level width of the multi-dimensional data structure in any dimension. In some cases, this may be determined by how many base level entities are associated with either the multi-dimensional data structure or the batch of intersection queries. Generally, the second approach of processing the set of intersection queries together using pre-cached modifier mappings may perform better for wider bases. Conversely, the first approach of processing each of the set of intersection queries individually may perform better for narrower bases. The base level width of the multi-dimensional data structure can be compared to a threshold value. The threshold value will vary for each particular implementation, and can be determined by simple experimentation.

In some embodiments, the bifurcation algorithm may also consider the dimension type of the dimension with the most number of requested intersections. Depending on the particular embodiment, certain dimension types may perform better using one of the two approaches. Because dimensions will vary widely between different multi-dimensional data structures, the dimension types favoring each approach can be determined by simple experimentation.

Some or all of these five factors that have been described in the preceding paragraphs may be considered by the bifurcation algorithm. Other factors may also be considered. These other factors may include characteristics of either the multi-dimensional data structure or the composition of the set of intersection queries.

In some embodiments, a single factor may predominate and may be used exclusively. However, in other embodiments, multiple factors may be used together to select between the first approach and the second approach for the bifurcation algorithm. In some embodiments, factors may be combined and/or thresholds may be combined to generate single factors and/or thresholds for comparison. Each factor may be multiplied by a weight that represents how important the particular factor is to the particular multi-dimensional data structuring use. For example, one particular multi-dimensional data structure weighted the number of requested intersections in each dimension the most (60% weight). The percentage of base level intersections that were populated with non-zero data was weighted second (25% weight), followed by the average depth of the tree for the requested intersections (10% weight), and finally the base level width of the tree in any dimension (5% weight).

In some embodiments, each factor may be evaluated individually against their own thresholds. It may be determined how far above or below the threshold each factor is for the particular data structure. This may be referred to as an over-the-threshold percentage (OTP) factor, and may be calculated for each factor. The OTP factors may then be combined with the weights described above to generate an overall OTP factor to be compared against an overall threshold. In one particular implementation, the bifurcation algorithm described above for selecting between the first approach and the second approach yielded an overall reduction in calculations of 60%.

It should be appreciated that the specific steps illustrated in FIGS. 6, 9, and 10 provide particular methods of processing sets of intersection queries according to various embodiments of the present invention. Other sequences of steps may also be performed according to alternative embodiments. For example, alternative embodiments of the present invention may perform the steps outlined above in a different order. Moreover, the individual steps illustrated in FIGS. 6, 9, and 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
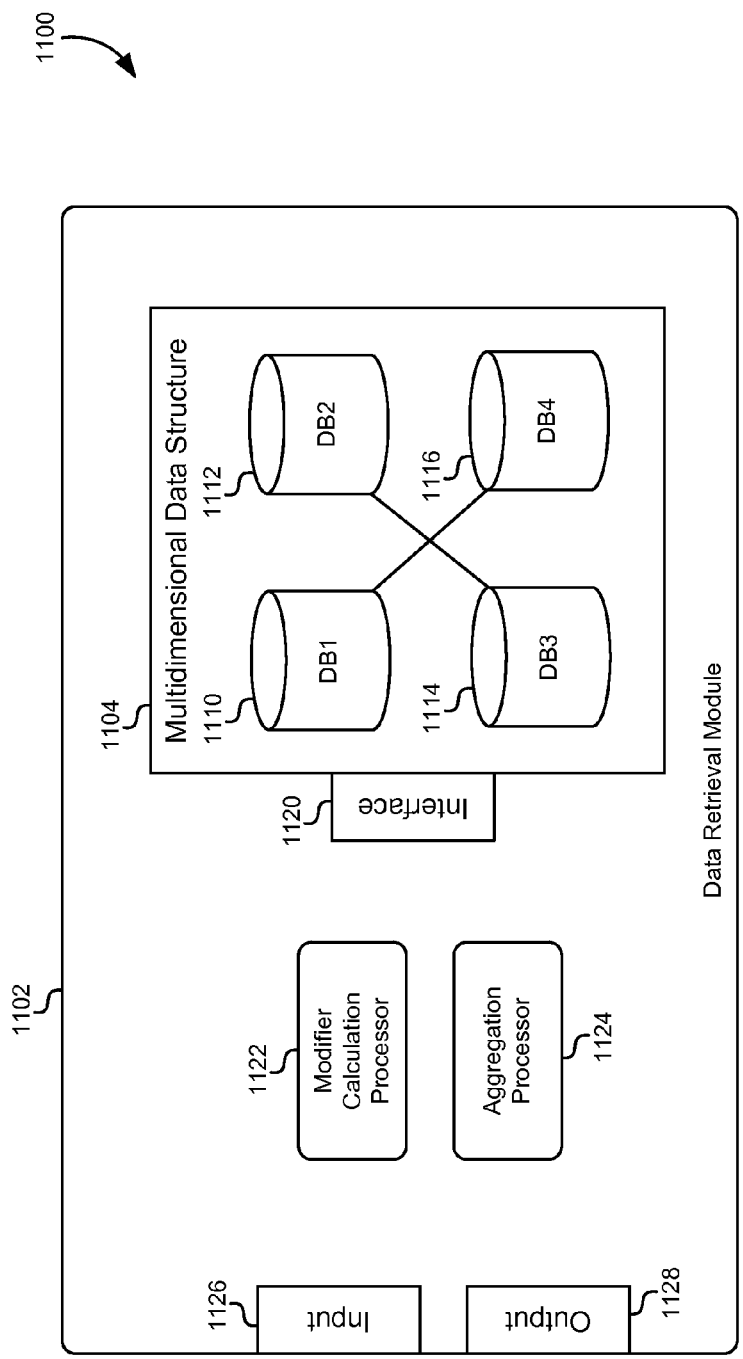
FIG. 11 illustrates a simplified block diagram of a special-purpose hardware system for processing a set of intersection queries, according to one embodiment.

FIG. 11 illustrates a simplified block diagram 1100 of a special-purpose hardware system for processing a set of intersection queries, according to one embodiment. As described above, the methods and systems described herein may be implemented using a general purpose computer system and/or a network computer environment, such as those described in relation to FIG. 1 and FIG. 2. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 1100 represents an abstraction of the functions that may be implemented using these types of hardware. After reading this disclosure, one having skill in the art could use these well-known circuit elements to construct the device shown in FIG. 11 to implement these methods and systems.

In this particular embodiment, a data retrieval module 1102 may be constructed using a number of discrete hardware components. An input port 1126 and/or and output port 1128 may be implemented using network interface hardware, peripheral interface hardware, physical cable interfaces, and/or the like. The input port 1126 and/or the output port 1128 may be configured to receive data packet transmissions that comprise batch queries and/or data provided by the data retrieval module 1102 using workstations or other querying processes.

A multidimensional data structure 1104 may be implemented using a number of hardware memory structures, such as disk arrays configured to store data as, for example, databases. A number of discrete databases 1110, 1112, 1114, 1116 may be combined and communicatively coupled to form a multidimensional data structure with different dimensions, transactions, and facets stored in the databases. An interface 1120 may be provided to the multidimensional data structure 1104 in order to query the data structure and retrieve information.

A modifier calculation processor 1122 may be implemented using a EEPROM, an FPGA, a lookup table, discrete digital circuitry, and/or the like. The modifier calculation processor 1122 may be configured to calculate modifiers for base level nodes retrieved from the multidimensional data structure 1104. Additionally, an aggregation processor 1124 may similarly be implemented using the components described above. The aggregation processor 1124 may be configured to combine base node values with modifiers calculated by the modifier calculation processor 1122 and provide an aggregated value to the multidimensional data structure 1104 and/or the output interface 1128.

In one embodiment, the various modules and systems in FIG. 11 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of processing a set of intersection queries in a multi-dimensional data structure, the method comprising:
    receiving the set of intersection queries for the multi-dimensional data structure;
    determining whether to process each of the set the intersection queries individually, or whether to process the set of intersection queries together using pre-cached modifier mappings, wherein:
        the pre-cached modifier mappings comprise mappings between values in nodes in the multi-dimensional data structure and values used to adjust the respective nodes before the respective nodes are rolled up into parent nodes; and
        processing the set of intersection queries together comprises:
            determining a set of intersection nodes from the set of intersection queries;
            enumerating a set of base nodes that descend from the set of intersection nodes;
            removing any duplicate base nodes from the set of base nodes;
            projecting each base node in the set of base nodes onto one or more corresponding intersection nodes using the pre-cached modifier mappings to compute intersection values for the intersection nodes; and
            providing the intersection values;
    processing the set of intersection queries; and
    providing the intersection values that correspond to the set of intersection queries.

2. The method of claim 1 wherein processing the intersection queries individually comprises, for each intersection query in the set of intersection queries:
    determining an intersection node from the intersection query;
    determining a set of base nodes that descend from the intersection node;
    computing a modifier for each node in the set of base nodes;
    projecting each base node onto the intersection node using the corresponding modifier to compute an intersection value; and
    providing the intersection value.

3. The method of claim 1 wherein determining whether to process each of the set the intersection queries individually, or whether to process the set of intersection queries together using the pre-cached modifier mappings, is based on a size of the set of intersection queries, such that processing the set of intersection queries individually is more likely when the size of the set of intersection queries is below a threshold, and processing the set of intersection queries together is more likely when the size of the set of intersection queries is above a threshold.

4. The method of claim 1 wherein determining whether to process each of the set the intersection queries individually, or whether to process the set of intersection queries together using the pre-cached modifier mappings, is based on a sparsity of the multi-dimensional data structure, such that processing the set of intersection queries individually is more likely when the sparsity of the multi-dimensional data structure is below a threshold, and processing the set of intersection queries together is more likely when the sparsity of the multi-dimensional data structure is above a threshold.

5. The method of claim 1 wherein determining whether to process each of the set the intersection queries individually, or whether to process the set of intersection queries together using the pre-cached modifier mappings, is based on an average depth of the multi-dimensional data structure for the set of intersection queries, such that processing the set of intersection queries individually is more likely when the average depth of the multi-dimensional data structure is below a threshold, and processing the set of intersection queries together is more likely when the average depth of the multi-dimensional data structure is above a threshold.

6. The method of claim 1 wherein determining whether to process each of the set the intersection queries individually, or whether to process the set of intersection queries together using the pre-cached modifier mappings, is based on a base level width of the multidimensional data structure, such that processing the set of intersection queries individually is more likely when the base-level width of the multi-dimensional data structure is below a threshold, and processing the set of intersection queries together is more likely when the base-level width of the multi-dimensional data structure is above a threshold.

7. A non-transitory computer-readable memory comprising a sequence of instructions which, when executed by one or more processors, causes the one or more processors to process a set of intersection queries in a multi-dimensional data structure by:
    receiving the set of intersection queries for the multi-dimensional data structure;
    determining whether to process each of the set the intersection queries individually, or whether to process the set of intersection queries together using pre-cached modifier mappings, wherein:
        the pre-cached modifier mappings comprise mappings between values in nodes in the multi-dimensional data structure and values used to adjust the respective nodes before the respective nodes are rolled up into parent nodes; and
        processing the set of intersection queries together comprises:
            determining a set of intersection nodes from the set of intersection queries;

enumerating a set of base nodes that descend from the set of intersection nodes;

removing any duplicate base nodes from the set of base nodes;

projecting each base node in the set of base nodes onto one or more corresponding intersection nodes using the pre-cached modifier mappings to compute intersection values for the intersection nodes; and providing the intersection values;

processing the set of intersection queries; and providing the intersection values that correspond to the set of intersection queries.

8. The non-transitory computer-readable memory according to claim 7 wherein processing the intersection queries individually comprises, for each intersection query in the set of intersection queries: determining an intersection node from the intersection query; determining a set of base nodes that descend from the intersection node; computing a modifier for each node in the set of base nodes; projecting each base node onto the intersection node using the corresponding modifier to compute an intersection value; and providing the intersection value.

9. The non-transitory computer-readable memory according to claim 7 wherein determining whether to process each of the set the intersection queries individually, or whether to process the set of intersection queries together using the pre-cached modifier mappings, is based on a size of the set of intersection queries, such that processing the set of intersection queries individually is more likely when the size of the set of intersection queries is below a threshold, and processing the set of intersection queries together is more likely when the size of the set of intersection queries is above a threshold.

10. The non-transitory computer-readable memory according to claim 7 wherein determining whether to process each of the set the intersection queries individually, or whether to process the set of intersection queries together using the pre-cached modifier mappings, is based on a sparsity of the multi-dimensional data structure, such that processing the set of intersection queries individually is more likely when the sparsity of the multi-dimensional data structure is below a threshold, and processing the set of intersection queries together is more likely when the sparsity of the multi-dimensional data structure is above a threshold.

11. The non-transitory computer-readable memory according to claim 7 wherein determining whether to process each of the set the intersection queries individually, or whether to process the set of intersection queries together using the pre-cached modifier mappings, is based on an average depth of the multi-dimensional data structure for the set of intersection queries, such that processing the set of intersection queries individually is more likely when the average depth of the multi-dimensional data structure is below a threshold, and processing the set of intersection queries together is more likely when the average depth of the multi-dimensional data structure is above a threshold.

12. The non-transitory computer-readable memory according to claim 7 wherein determining whether to process each of the set the intersection queries individually, or whether to process the set of intersection queries together using the pre-cached modifier mappings, is based on a base level width of the multidimensional data structure, such that processing the set of intersection queries individually is more likely when the base-level width of the multi-dimensional data structure is below a threshold, and processing the set of intersection queries together is more likely when the base-level width of the multi-dimensional data structure is above a threshold.

13. A system comprising:

one or more processors; and a memory communicatively coupled with and readable by the one or more processors and comprising a sequence of instructions which, when executed by the one or more processors, cause the one or more processors to process a set of intersection queries in a multi-dimensional data structure by:

receiving the set of intersection queries for the multi-dimensional data structure;

determining whether to process each of the set the intersection queries individually, or whether to process the set of intersection queries together using pre-cached modifier mappings, wherein:

the pre-cached modifier mappings comprise mappings between values in nodes in the multi-dimensional data structure and values used to adjust the respective nodes before the respective nodes are rolled up into parent nodes; and processing the set of intersection queries together comprises:

determining a set of intersection nodes from the set of intersection queries;

enumerating a set of base nodes that descend from the set of intersection nodes;

removing any duplicate base nodes from the set of base nodes;

projecting each base node in the set of base nodes onto one or more corresponding intersection nodes using the pre-cached modifier mappings to compute intersection values for the intersection nodes; and providing the intersection values;

processing the set of intersection queries; and providing the intersection values that correspond to the set of intersection queries.

14. The system of claim 13 wherein processing the intersection queries individually comprises, for each intersection query in the set of intersection queries: determining an intersection node from the intersection query; determining a set of base nodes that descend from the intersection node; computing a modifier for each node in the set of base nodes; projecting each base node onto the intersection node using the corresponding modifier to compute an intersection value; and providing the intersection value.

15. The system of claim 13 wherein determining whether to process each of the set the intersection queries individually, or whether to process the set of intersection queries together using the pre-cached modifier mappings, is based on an average depth of the multi-dimensional data structure for the set of intersection queries, such that processing the set of intersection queries individually is more likely when the average depth of the multi-dimensional data structure is below a threshold, and processing the set of intersection queries together is more likely when the average depth of the multi-dimensional data structure is above a threshold.

16. The system of claim 13 wherein determining whether to process each of the set the intersection queries individually, or whether to process the set of intersection queries together using the pre-cached modifier mappings, is based on sparsity of the multi-dimensional data structure, such that processing the set of intersection queries individually is more likely when the sparsity of the multi-dimensional data structure is below a threshold, and processing the set of intersection queries together is more likely when the sparsity of the multi-dimensional data structure is above a threshold.

17. The system of claim 13 wherein determining whether to process each set of intersection queries individually, or whether to process the set of intersection queries together using the pre-cached modifier mappings, is based on an average depth of the multi-dimensional data structure for the set of intersection queries, such that processing the set of intersection queries individually is more likely when the average depth of the multi-dimensional data structure is below a threshold, and processing the set of intersection queries together is more likely when the average depth of the multi-dimensional data structure is above a threshold.

18. The system of claim 13 wherein determining whether to process each set of intersection queries individually, or whether to process the set of intersection queries together using the pre-cached modifier mappings, is based on a base level width of the multidimensional data structure, such that processing the set of intersection queries individually is more likely when the base-level width of the multi-dimensional data structure is below a threshold, and processing the set of intersection queries together is more likely when the base-level width of the multi-dimensional data structure is above a threshold.

* * * * *